US008885207B2

(12) United States Patent
Kondoh

(10) Patent No.: US 8,885,207 B2
(45) Date of Patent: Nov. 11, 2014

(54) PRINTING APPARATUS FOR PRINTING ON ENVELOPE

(75) Inventor: Yoshikazu Kondoh, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 123 days.

(21) Appl. No.: 13/616,687

(22) Filed: Sep. 14, 2012

(65) Prior Publication Data

US 2013/0094061 A1 Apr. 18, 2013

(30) Foreign Application Priority Data

Oct. 12, 2011 (JP) ................................. 2011-224607

(51) Int. Cl.
*G06K 15/00* (2006.01)

(52) U.S. Cl.
USPC .............. 358/1.18; 358/449; 358/474; 271/2; 271/9.01; 399/370; 399/371

(58) Field of Classification Search
CPC ............... G07B 17/00508; G07B 2017/00491; B65H 2511/10; B65H 2701/1916; G03G 2215/00514
USPC .................... 358/1.18, 449, 474; 271/2, 9.01; 399/370, 371
See application file for complete search history.

(56) References Cited

U.S. PATENT DOCUMENTS

| | | | | |
|---|---|---|---|---|
| 5,426,915 | A * | 6/1995 | Davidov | 53/411 |
| 5,819,666 | A * | 10/1998 | Ishikawa et al. | 101/483 |
| 2008/0252825 | A1 | 10/2008 | Kim et al. | |

FOREIGN PATENT DOCUMENTS

| | | | | |
|---|---|---|---|---|
| CN | 101830122 | A | 9/2010 | |
| JP | 07-304225 | | 11/1995 | |
| JP | 07304225 | A * | 11/1995 | B41J 21/00 |
| JP | 2002-240382 | | 8/2002 | |
| JP | 2003-108342 | | 4/2003 | |
| JP | 2006-095999 | | 4/2006 | |
| JP | 2008-260132 | | 10/2008 | |
| JP | 2008-262205 | | 10/2008 | |

* cited by examiner

*Primary Examiner* — Jacky X Zheng
(74) *Attorney, Agent, or Firm* — Renner, Otto, Boisselle & Sklar, LLP

(57) ABSTRACT

The printing apparatus for printing at least an address on an envelope that is set to a paper tray includes an envelope size detection portion for scanning an address print side of an envelope set to the paper tray to detect a size of the envelope based on a read image of the address print side; a print position setting portion for setting a print position of an address corresponding to the read size of the envelope; and a data synthesis processing portion for synthesizing the read image of the address print side and an image of the address at a position set by the print position setting portion and previews the synthesized address print image of the envelope on a display device.

5 Claims, 7 Drawing Sheets

PRINTING APPARATUS FOR PRINTING ON ENVELOPE

CROSS-NOTING PARAGRAPH

This non-provisional application claims priority under 35 U.S.C. §119(a) on Patent Application No. 2011-224607 filed in JAPAN on Oct. 12, 2011, the entire contents of which are hereby incorporated herein by reference.

FIELD OF THE INVENTION

The present invention relates to a printing apparatus for performing printing on an envelope as recording paper.

BACKGROUND OF THE INVENTION

In the field of printing apparatuses such as a copier and a printer, a printing apparatus capable of printing an image not only on a sheet in a standard size such as A4 or B4 but also on a sheet in a non-standard size such as a postcard, an envelope and a name card has been conventionally known. When a zip code, an address and an addressee are printed on a post card or an envelope with such a copier or a printer, it is necessary to appropriately arrange a print side (front or back side) and a direction (top or bottom) when a postcard or an envelope as recording paper is set to a paper tray, and it is impossible to properly perform printing with erroneous setting.

In Japanese Laid-Open Patent Publication No. 2002-240382, in the case of feeding a set post card, a postcard face is scanned to be analyzed, followed by judgment of a set state of the postcard, so that a user is able to reset the postcard to a correct direction before printing in the case of erroneously setting a print side or a direction of the postcard.

However, in Japanese Laid-Open Patent Publication No. 2002-240382, there is no description about alignment of print positions of a zip code, an address and an addressee in a case where recording paper is an envelope. In a case where recording paper is a postcard, two types of standards of standard sizes (post card and double postal card) and a large size are defined for allowable sizes. However, any size is allowable for an envelope. Thus, it is necessary for alignment of print positions of a zip code, an address and an addressee. Moreover, in the case of setting an envelope to a printing apparatus, it is necessary for alignment of print positions of a zip code and the like depending on a state whether the envelope is sealed or not. For approaching such a problem, nothing is disclosed in Japanese Laid-Open Patent Publication No. 2002-240382.

SUMMARY OF THE INVENTION

An object of the present invention is to provide a printing apparatus capable of confirming in advance print positions of a zip code, an address and an addressee on various envelopes as recording paper that is set to a paper tray.

An object of the present invention is to provide a printing apparatus for printing at least an address on an envelope that is set to a paper tray comprising: an envelope size detection portion for scanning an address print side of the set envelope to detect a size of the envelope based on a read image of the address print side; a print position setting portion for setting a print position of an address corresponding to the read size of the envelope; and an image synthesis portion for synthesizing the read image of the address print side and an image of the address at a position set by the print position setting portion, wherein the synthesized address print image of the envelope is previewed on a display device.

Another object of the present invention is to provide the printing apparatus, wherein the read image of the address print side is previewed on the display device.

Another object of the present invention is to provide the printing apparatus, wherein the print position setting portion allocates an area of the address print side at a predetermined rate to seta print position of the address.

Another object of the present invention is to provide the printing apparatus, wherein the print position setting portion includes an analysis portion for a read image of the address print side, and when it is confirmed that a zip code entry column is filled in, sets a print position of a zip code to the analyzed position of the zip code entry column.

Another object of the present invention is to provide the printing apparatus, further comprising an operation portion for correcting an address print position in the previewed address print image of the envelope.

PREFERRED EMBODIMENTS OF THE INVENTION

Figure 1:
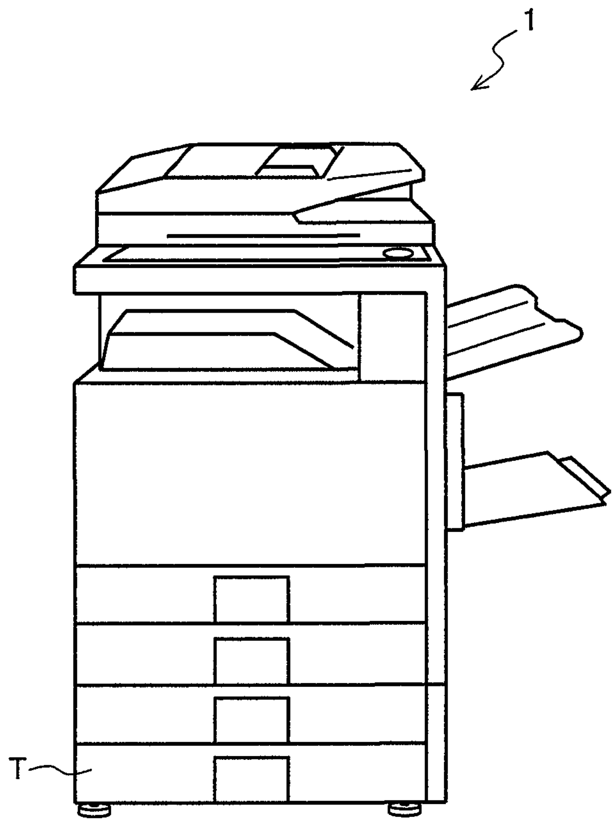
FIG. 1 is an external view of an example of a printing apparatus of the present invention.

FIG. 1 is an external view of an example of a printing apparatus of the present invention. The printing apparatus of the present invention is provided with a paper tray T to which an envelope is set as a sheet as illustrated by a referential mark 1, in which at least an address is printed on an envelope that is set to the paper tray T. Such a printing apparatus 1 is provided with an envelope scan portion for scanning an address print side of the envelope that is set to the paper tray T as one of the characteristics.

Figure 2:
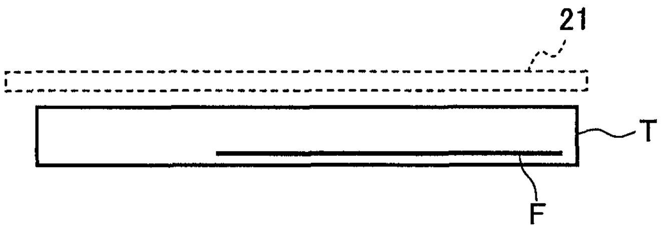
FIG. 2 is a diagram explaining an example of an envelope scan portion.
Figure 3:
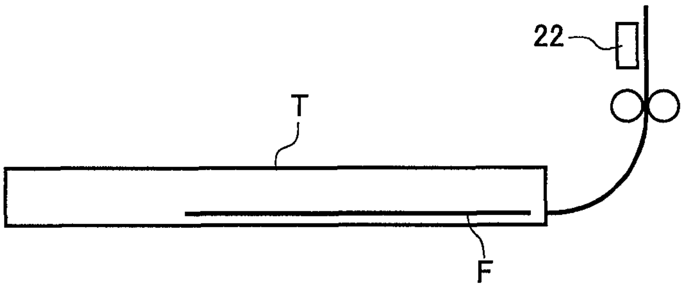
FIG. 3 is a diagram explaining another example of the envelope scan portion.

FIG. 2 and FIG. 3 are diagrams explaining examples of the envelope scan portion.

The envelope scan portion of the example of FIG. 2 is comprised of a scanner unit 21 that is placed so as to cover the whole paper tray T to which an envelope F is set to scan the inside of the paper tray T.

The envelope scan portion of the example of FIG. 3 is comprised of an image sensor 22 that is provided in a paper conveyance path P leading from the paper tray T to which the envelope F is set to a print portion.

A scanned image of an envelope is used for preview display as described below. In a configuration of FIG. 3, it is necessary to feed one sheet of an envelope before preview display.

Figure 4:
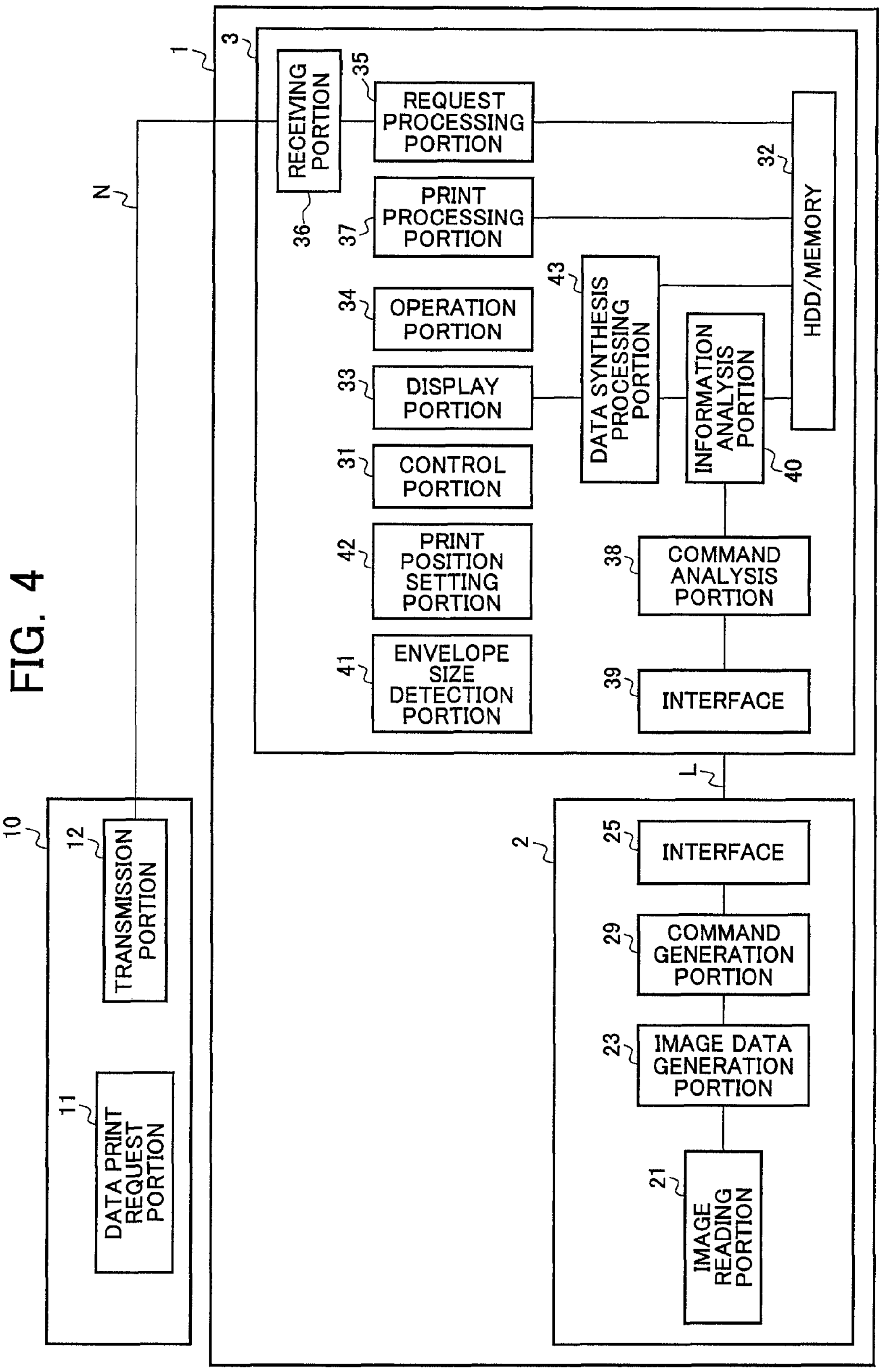
FIG. 4 is a block diagram showing an exemplary circuit configuration of functional elements of the printing apparatus of FIG. 1.

FIG. 4 is a block diagram showing a configuration example of functional elements of the printing apparatus 1 of FIG. 1.

As shown in FIG. 4, the printing apparatus 1 is connected to, for example, a PC (Personal Computer) 10 via a network N such as a wired LAN (Local Area Network). The PC 10 transmits a print request to the printing apparatus 1 via a transmission portion 12 according to an instruction received from a user via a data print request portion 11.

The printing apparatus 1 is a printer for printing based on the print request received from the PC 10, and comprised of an envelope scan portion 2 and an apparatus body portion 3.

The envelope scan portion 2 for scanning an address print side of an envelope that is set to a paper tray is provided with an image reading portion (hereinafter, referred to as an image reading portion 21) comprised of a scanner unit 21 (see FIG. 2) for scanning the inside of the paper tray to which an envelope is set, and the like; an image data generation portion 23 for generating image data based on the read image of the envelope; and a command generation portion 24 for converting the image data to a command in a form adapting to a signal line L, in which the above-described command is transmitted to the apparatus body portion 3 through the signal line L via an interface 25.

The apparatus body portion 3 is provided with a control portion 31, an HDD/memory 32, a display portion 33, an operation portion 34, a request processing portion 35, a receiving portion 36, a print processing portion 37, a command analysis portion 38, an interface 39, an information analysis portion 40, an envelope size detection portion 41, a print position setting portion 42 and a data synthesis processing portion 43.

The control portion 31 which is comprised of a CPU (Central Processing Unit) and the like reads and executes various programs that are stored in the HDD/memory 32, thereby performing a wide variety of operation and control of the apparatus body portion 3. The HDD/memory 32 stores a wide variety of data, programs and the like for operating the printing apparatus 1.

The display portion 33 for displaying various pieces of information is comprised of a liquid crystal display and the like. The operation portion 34 for receiving a wide variety of instruction operation is comprised of a touch sensor constituting a touch sensor with a group of keys and a liquid crystal display.

The request processing portion 35 processes the print request that is received via the receiving portion 36 to generate a print image for storing in the HDD (Hard Disk Drive)/memory 32. The print processing portion 37 prints the print image stored in the HDD/memory 32 on recording paper that is fed from a paper tray.

The command analysis portion 38 analyzes a command received from the envelope scan portion 2 through the signal line L via the interface 39 to generate image data. The information analysis portion 40 generates an image on an address print side of an envelope (hereinafter, referred to as an address print-side image) based on the image data generated by the command analysis portion 38 for storing in the HDD/memory 32.

The envelope size detection portion 41 detects a size of an envelope that is set to a paper tray based on the address print-side image.

The print position setting portion 42 sets a print position of an address corresponding to the size of the envelope that is detected by the envelope size detection portion 41.

The data synthesis processing portion 43 is an image synthesis portion for synthesizing, when the printing apparatus 1 receives a print request for instructing to print an address on an envelope, at a position set by the print position setting portion 42 a print image, that is, an address image that is temporarily stored in the HDD/memory 32 and an address print-side image of an envelope that is stored in the same manner. The synthesized preview image is displayed on the display portion 33.

Figure 5:
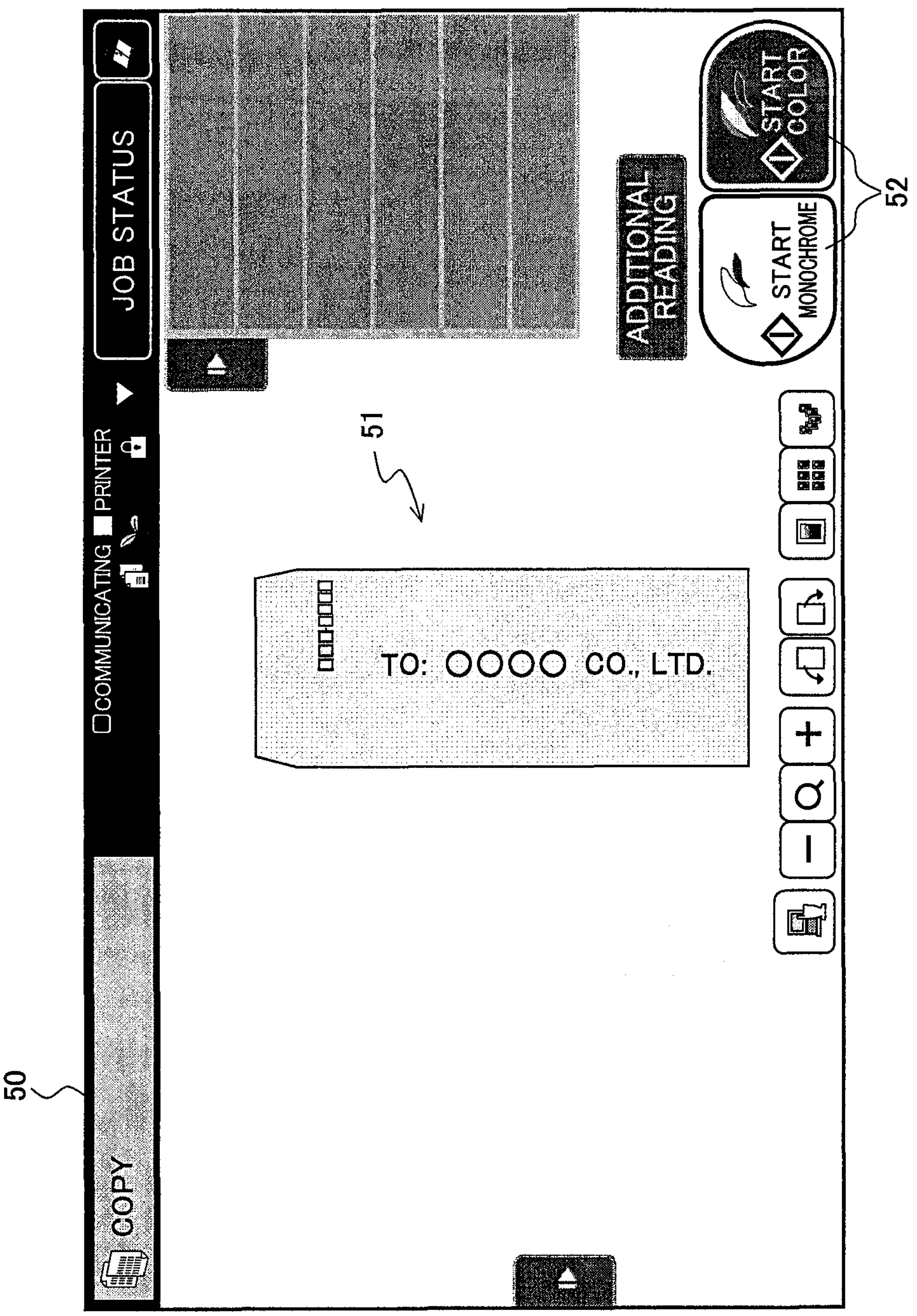
FIG. 5 is a diagram explaining an example of a screen that is displayed in preview display performed by the printing apparatus of FIG. 2.

FIG. 5 is a diagram explaining an example of a screen that is displayed in preview display performed by the printing apparatus 1.

A GUI image 50 incorporates in a GUI image a preview image 51 having an address image and an address print-side image of an envelope which are synthesized for display. With this preview image 51, a user is able to confirm in advance print positions of a zip code, an address and an addressee on the envelope that is set to a paper tray.

Further, a print start key 52 is displayed on the GUI image 50, and a user operates the print start key 52, thereby starting by the print processing portion 37 printing of the address image onto a position of the envelope set by the print position setting portion 42.

Additionally, on occasions such as inappropriate print positions in which a zip code entry column overlaps an addressee on an envelope in a preview image, a user performs operation for a GUI image and operation of the group of keys of the operation portion 34 while viewing the GUI image, and is thereby able to adjust an address print position. Adjustment operation of such an address print position is received by the operation portion 34, and adjustment information of the print position is stored in the HDD/memory 32.

In the case of performing printing after the adjustment operation of the address print position, in the printing apparatus 1, according to the adjustment information of the print position stored in the HDD/memory 32, the print processing portion 37 generates a print image with the address image displaced, that is, performs printing onto the displaced position.

Further, a method of setting an address print position in the print position setting portion 42 is, for example, a method of allocating an area of an address print side at a predetermined rate to set the address print position. More specifically, for example, a method is provided for allocating 20% of a center area for an address, allocating 10% of an upper right area for an area for a zip code and allocating 15% of a right area for an address column.

Moreover, the print position setting portion 42 includes an analysis portion for a read image on an address print side (not shown), and may set, in a case where a zip code entry column is confirmed as a result of analysis, a print position of a zip code to the analyzed position of the zip code entry column.

Figure 6:
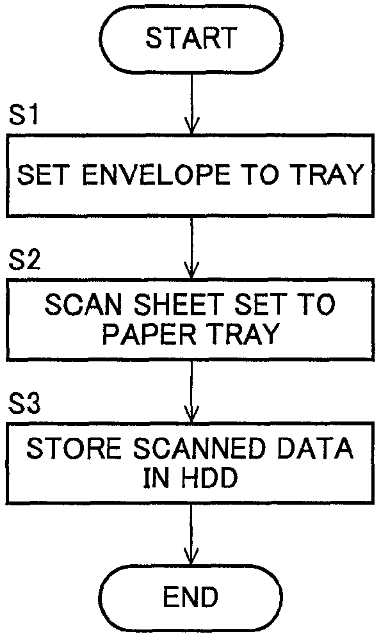
FIG. 6 is a diagram explaining an example of envelope scan processing in the printing apparatus of FIG. 4.

FIG. 6 is a diagram explaining an example of envelope scan processing in the printing apparatus 1 of FIG. 4.

In the printing apparatus 1, as illustrated, in the case of detecting that an envelope is set to a paper tray (step S1), the envelope scan portion 2 scans an address print side of the envelope that is set to the paper tray (step S2). Then, an image of the address print side that is obtained by scan is stored as an envelope image in the HDD/memory 32 through the information analysis portion 40 and the like (step S3).

Figure 7:
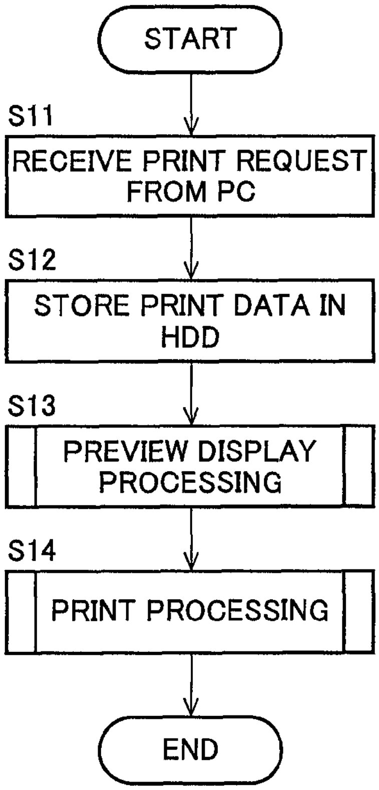
FIG. 7 is a diagram explaining an example of print processing in the printing apparatus of FIG. 4.

FIG. 7 is a diagram explaining an example of print processing in the printing apparatus 1 of FIG. 4.

In the printing apparatus 1, as illustrated, when a print request for instructing to print an address on an envelope is received from the PC 10 (step S11), the print request is processed by the request processing portion 35 to generate an address image for storing in the HDD/memory 32 (step S12). Then, preview display processing illustrated in FIG. 8 described below is performed by the data synthesis processing portion 43 and the display portion 33 based on the address print-side image and an address image stored in the HDD/memory 32 (step S13), and print processing illustrated in FIG. 9 described below is performed by the print processing portion 37 (step S14).

Figure 8:
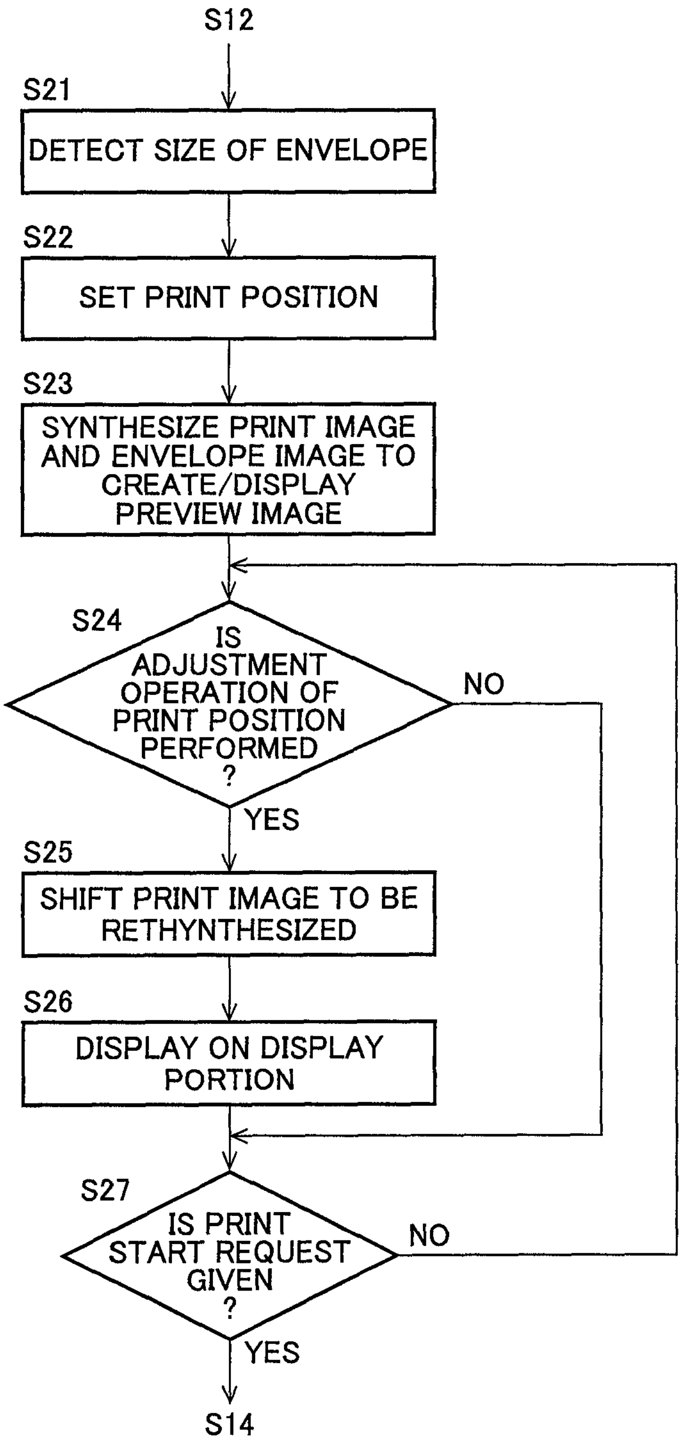
FIG. 8 is a diagram explaining an example of preview display processing at step S13 of FIG. 7.

FIG. 8 is a diagram explaining an example of preview display processing at step S13 of FIG. 7.

In the printing apparatus 1, as illustrated, based on the address print-side image, a size of an envelope that is set to the paper tray is first detected by the envelope size detection portion 41 (step S21). Then, a print position of the address is set by the print position setting portion 42 corresponding to the size of the envelope that is detected by the envelope size detection portion 41 (step S22), and the address image and the address print-side image stored in the HDD/memory 32 are synthesized by the data synthesis processing portion 43 at a position set by the print position setting portion 42 to be displayed on the display portion 33 as a preview image (step S23).

Then, determination is made on whether or not to perform adjustment operation of a print position via the operation portion 34 (step S24). In a case where the adjustment operation of the print position is not performed (in the case of NO), the process directly goes to step S27, however, in a case where the adjustment operation of the print position is performed (in the case of YES), adjustment information of the print position is stored in the HDD/memory 32, and the address image is shifted according to the adjustment information of the print position to resynthesize/create a preview image by the data synthesis processing portion 43 (step S25), followed by display on the display portion 33 (step S26), thereafter the process moves to step S27.

At step S27, determination is made on whether or not a print start request is given based on whether or not to perform operation of the print start key 52 for the GUI image 50 of FIG. 5. In a case where the print start request is not given (in the case of NO), the process returns to step S42, and in a case where the print start request is given (in the case of YES), the process moves to step S12 of FIG. 7.

Figure 9:
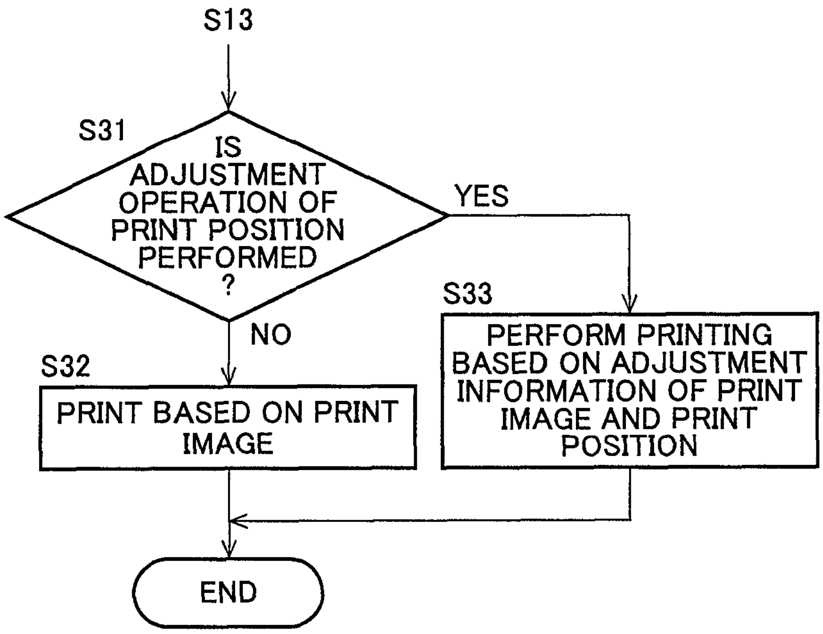
FIG. 9 is a diagram explaining an example of print processing at step S14 of FIG. 7.

FIG. 9 is a diagram explaining an example of print processing at step S14 of FIG. 7.

In the printing apparatus 1, as illustrated, determination is first made on whether or not to perform adjustment operation of a print position based on whether or not adjustment information of a print position is stored in the HDD/memory 32 (step S31).

In the print processing portion 37, in a case where the adjustment operation of the print position is not performed (in the case of NO), the address image stored in the HDD/memory 32 is printed at a position of an envelope set by the print position setting portion 42 (step S32), while, in a case where the adjustment operation of the print position is performed (in the case of YES), the print image stored in the HDD/memory 32 is printed onto a position displaced from the position of the envelope set by the print position setting portion 42 according to the adjustment information of the print position stored in the HDD/memory 32 (step S33).

Note that, in the printing apparatus 1, until a print request of an address for an envelope is input, an address print-side image of the envelope that is set to a paper tray may be displayed on the display portion 33. A user views this image, and is thereby able to confirm whether the envelope is properly set to the paper tray such as whether the envelope is not set to the paper tray upside down.

Hereinbefore, an example is described which impliments the present invention as a printer for performing printing of an image that is input from a PC, however, the present invention is also applicable to a printing apparatus that is configured as a copier.

As described above, with the printing apparatus of the present invention, it is possible to confirm in advance print positions of a zip code, an address and an addressee on various envelopes as recording paper that is set to a paper tray, thus making it possible to prevent erroneous printing on an envelope.

The invention claimed is:

1. A printing apparatus for printing at least an address on an envelope that is set to a paper tray comprising:

an envelope size detection portion for scanning an address print side of the envelope set to the paper tray and detecting the set envelope to detect a size of the envelope based on a read image of the address print side;

a print position setting portion for setting a print position of an address corresponding to the read size of the envelope; and an image synthesis portion for synthesizing the read image of the address print side and an image of the address at a position set by the print position setting portion, wherein the synthesized address print image of the envelope is previewed on a display device, and the print position setting portion allocates an area of the address print side at a predetermined rate to set an area for an addressee, an area for a zip code, and an area for the address.

2. The printing apparatus as defined in claim 1, wherein the read image of the address print side is previewed on the display device.

3. The printing apparatus as defined in claim 1, wherein until a print request of an address for the envelope is input, the read image of the address print side is previewed.

4. The printing apparatus as defined in claim 1, wherein when detecting that an envelope is set to the paper tray, scanning the address print side of the set envelope is performed.

5. The printing apparatus as defined in claim 1, further comprising an operation portion for correcting an address print position in the previewed address print image of the envelope.

* * * * *